__United States Patent Office__

3,740,400
Patented June 19, 1973

3,740,400
CONVERSION OF HETEROAROMATIC METHYL
COMPOUNDS TO NITRILES
Gerald Berkelhammer, Princeton, and William Henry
Gastrock, Hightstown, N.J., assignors to American
Cyanamid Company, Stamford, Conn.
No Drawing. Filed Feb. 1, 1971, Ser. No. 111,732
Int. Cl. C07d 51/36
U.S. Cl. 260—250 R       7 Claims

ABSTRACT OF THE DISCLOSURE

The present invention relates to a novel process for the preparation of 5- and 6-membered heteroaromatic nitriles having a formula selected from the group consisting of:

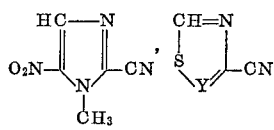

where Y is N or CH; and

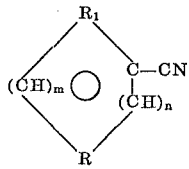

where R and $R_1$ each represent N, N=N or CH, $m$ and $n$ each represent an integer selected from the group consisting of 0, 1 and 2 and provided that at least one of R and $R_1$ represents a member other than CH and that the resulting compounds are limited to 6-membered rings. The process of this invention involves reaction, in the presence of an inert organic solvent, of a 5- or 6-membered heteroaromatic compound of the formula selected from the group consisting of:

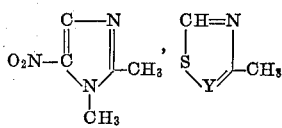

and

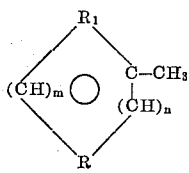

where Y, R, $R_1$, $m$ and $n$ are as described above, with nitrosyl chloride or a nitrogen oxide selected from the group consisting of nitrogen tetroxide, nitrogen trioxide and nitrogen pentoxide.

SUMMARY OF THE INVENTION

The present invention relates to a novel process for the preparation of 5- and 6-membered heteroaromatic nitriles. More particularly, it relates to a process for the preparation of 5-membered heteroaromatic nitriles having the formula:

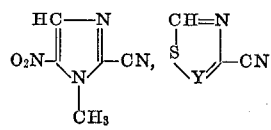

where, Y is N or CH and 6-membered heteroaromatic nitriles having the formula:

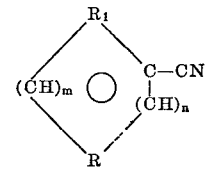

where R and $R_1$ each represent N, N=N or CH, $m$ and $n$ each represent 0, 1 or 2, providing that at least one of R and $R_1$ represents a member other than CH and provided also that the ring size of compounds of this structure is limited to 6-members.

Advantageously, these compounds can be prepared by reacting a 5- or 6-membered heteroaromatic compound of the formulae selected from the group:

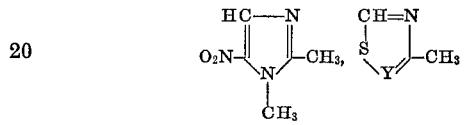

and

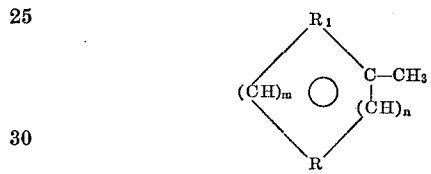

wherein Y, R, $R_1$, $n$ and $m$ are described; with nitrosyl chloride or a nitrogen oxide selected from the group consisting of nitrogen tetroxide, nitrogen trioxide and nitrogen pentoxide in the presence of an inert organic solvent preferably selected from the group consisting of benzene, nitrobenzene, carbon tetrachloride, nitromethane, and acetonitrile.

This reaction is generally carried out at a temperature between about 25° and 150° C. and preferably between 50° and 120° C., and at a pressure between about 1 and 10 atmospheres. However, where desired the reaction may also be carried out at a temperature as low as 20° C. and at standard pressure. Under such conditions, however, the reaction period will usually have to be extended to about 20 to 24 hours to obtain satisfactory product yields. Moreover, we have found that the presence of a base in the reaction medium may serve to improve product yield and/or reduce reaction time. Among the bases found most useful in the process are the alkali metal salts of organic and inorganic acids including: the acetates, formates, propionates, benzoates, carbonates and phosphates.

The reaction is usually completed in from about 15 minutes to about 4 hours; however, as previously indicated, it may require as much as 24 hours to carry out the reaction depending on the reaction conditions established. In general, we have found it desirable to continue the reaction for an extended period when very mild conditions, i.e. standard temperature and pressure, are used; whereas, at elevated temperatures in the neighborhood of 50° to 100° C. and a few atmospheres (i.e. about 2–5 atmospheres), the reaction proceeds rapidly and can be completed or essentially completed in a relatively short period of time (i.e. 15 minutes to about 4 hours). Usually, at least about 1 mole equivalent of the methyl heteroaromatic compound such as dimethylnitroimidazole, methylpyridine, methylthiazole, methylpyridazine, methylpyrazine, or methylpyrimidine per mole of nitrogen oxide is required to obtain satisfactory conversion of the methyl group to the nitrile and it is preferable to employ an excess of the nitrogen oxide (i.e. two to six mole equivalents of nitrogen trioxide, nitrogen tetroxide, nitrogen pentoxide or nitrosyl chloride per mole of the methyl heteroaromatic compound). Even greater excess of the nitrogen oxide may be used, but is not required.

As indicated, a base is not required for the reaction of the present process. However, the addition to the reaction mixture of from about 1 to 5 equivalents of base per mole of the methyl heteroaromatic compound can be used with advantage and sodium acetate, sodium carbonate, potassium carbonate and potassium acetate are among the preferred bases.

The process of the present invention is useful since it provides compounds which are effective as herbicidal, nematocidal or fungicidal agents or as intermediates for the preparation of antibacterial agents effective for controlling bacterial infections in warm-blooded animals. One such compound which is particularly effective for controlling bacterial infections in warm-blooded animals and which can be prepared from 2-cyano-1-methyl-5-nitroimidazole, is 2-(2-amino-5-thiadiazolyl)-1-methyl-5-nitroimidazole disclosed in the Berkelhammer et al. U.S. Pat. No. 3,452,035, issued June 24, 1969.

Conversion of 2-cyano-1-methyl-5-nitroimidazole to the antibacterial agent 2-(2-amino-5-thiadiazolyl)-1-methyl-5-nitroimidazole is described in the copending application of W. H. Gastrock, Ser. No. 864,861, filed Oct. 8, 1969, a co-inventor named in the present application. In the process 2-cyano-1-methyl-5-nitroimidazole is treated with a strong base such as sodium or potassium methoxide, sodium or potassium t-butoxide or the like, at from 0° C. to 100° C. and preferably 20° to 30° C. The reaction is conducted in a lower alkyl alcohol solvent and yields the imidazolecarboximidate having the structure:

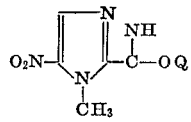

where Q is a loweralkyl radical derived from the solvent.

The imidazolecarboximidate is then readily converted to the biologically active thiadiazole having the formula:

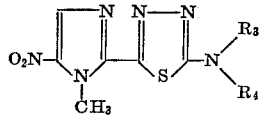

wherein, $R_3$ and $R_4$ are hydrogen or loweralkyl $C_1$-$C_4$, by treating said imidazolecarboximidate with a thiosemicarbazide of the formula:

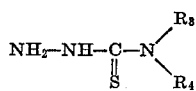

where $R_3$ and $R_4$ are as described above. The reaction is carried out in the presence of a strong mineral acid or a strong organic acid with heating.

DETAILED DESCRIPTION OF THE INVENTION

The invention is further illustrated by the examples set forth below as to reaction procedures and methods of testing.

Example 1.—2-cyano-1-methyl-5-nitroimidazole

Nitrosyl chloride is bubbled into a solution of 1.41 g. of 1,2-dimethyl-5-nitroimidazole in 50 ml. of dry benzene while heating at 64–79° for 4⅓ hours. The reaction mixture is cooled in a water bath and the solid, 1,2-dimethyl-5-nitroimidazole hydrochloride, is filtered. The filtrate is evaporated to dryness leaving 0.45 g. of yellow oil having nitrile absorption at 2270 cm.$^{-1}$ in the infrared spectrum. The oil is slurried with $NaHCO_3$ solution and extracted with chloroform. Washing, drying and evaporation to dryness affords 0.20 g. of residue which is shown to be 2-cyano-1-methyl-5-nitroimidazole by gas chromatographic comparison to authentic material.

Example 2.—2-cyano-1-methyl-5-nitroimidazole

To a 200 ml. glass pressure vessel containing 1.41 g. (0.01 mole) of 1,2-dimethyl-5-nitroimidazole in 50 ml. of dry benzene is added 5.7 ml. (0.12 mole) of liquid nitrosyl chloride. The vessel is closed by means of a screw cap carrying a pressure gauge and release valve and heated in an oil bath at 70–82° for 4 hours. The vessel is allowed to cool and the residual pressure is released. The solid, starting material hydrochloride, is filtered and the filtrate is evaporated to dryness giving 0.14 g. of yellow residue. Gas-liquid chromatographic analysis shows the presence of 2-cyano-1-methyl-5-nitroimidazole in the residue.

Example 3.—2-cyano-1-methyl-5-nitroimidazole

To a cold mixture of 1.41 g. of 1,2-dimethyl-5-nitroimidazole, 4.92 g. of sodium acetate and 50 ml. of carbon tetrachloride is added 3.9 ml. of liquid dinitrogen tetroxide and the pressure vessel is closed using a gauge and release valve. The vessel is heated in an oil bath at 74–83° for 4 hours. The vessel is cooled, the pressure is released and 50 ml. of benzene is added. The solid is filtered and the filtrate is evaporated to dryness leaving an oily yellow solid. Gas chromatographic analysis shows the solid to be a mixture of 2-cyano-1-methyl-5-nitroimidazole and starting 1,2-dimethyl-5-nitroimidazole by comparison to authentic material. In a similar manner, the above reaction can be run using sodium formate, sodium propionate, sodium benzoate, potassium acetate, sodium carbonate, potassium carbonate and disodium phosphate in place of the sodium acetate.

Example 4.—2-cyano-1-methyl-5-nitroimidazole

To a cold solution of 1.41 g. of 1,2-dimethyl-5-nitroimidazole in 50 ml. of dry nitromethane is added 4.1 ml. of liquid dinitrogen tetroxide. The pressure vessel is closed and heated in an oil bath at 80–82° for 4 hours. The reaction mixture is cooled in a water bath and the pressure is released. The excess dinitrogen tetroxide is evaporated under a stream of air and the solution is evaporated to dryness. The residue is slurried with 200 ml. of benzene and the supernatant is decanted from the insoluble oil. The insoluble oil is slurried with aqueous sodium bicarbonate solution and extracted with chloroform. Evaporation of the chloroform extracts yields 1.1 g. of starting 1,2-dimethyl-5-nitroimidazole. The supernatant from above is evaporated to dryness affording 0.048 g. of pale yellow oil, which solidifies on standing. This material is shown to be 2-cyano-1-methyl-5-nitroimidazole by gas chromatographic comparison to authentic material.

The above reaction can be carried out using carbon tetrachloride or acetonitrile in place of the nitromethane.

By the above procedure pyrazinonitrile, 4-pyridazinecarbonitrile, 2-pyrimidinecarbonitrile and 1,2,4-thiadiazole-3-carbonitrile are prepared by replacing the 1,2-dimethyl-5-nitroimidazole with methylpyrazine, 4-methylpyridazine, 2-methylpyrimidine and 3-methyl-1,2,4-thiadiazole, respectively.

Example 5.—2-cyano-1-methyl-5-nitroimidazole

Following the procedure in Example 4 and using 2.0 ml. of dinitrogen tetroxide yields 0.135 g. of oil which is shown to be mainly 2-cyano-1-methyl-5-nitroimidazole by gas chromatographic analysis.

In a similar manner using 1.3 ml. of dinitrogen tetroxide affords 0.06 g. of 2-cyano-1-methyl-5-nitroimidazole and 1.21 g. of 1,2-dimethyl-5-nitroimidazole.

Example 6.—2-cyano-1-methyl-5-nitroimidazole

To a cold mixture of 1.41 g. of 1,2-dimethyl-5-nitroimidazole and 7.4 g. of sodium acetate in 50 ml. of dry nitromethane is added 3.9 ml. of liquid dinitrogentetroxide. The pressure vessel is closed and heated in an oil bath at 58–74° for 4¼ hours. The reaction mixture is cooled in a water bath and the pressure is released. The solid is filtered and washed with nitromethane. The filtrate is evaporated to dryness and the residue is dissolved in 100 ml. of chloroform and the resulting solution is washed with 10% sodium bicarbonate solution. The organic layer is dried and evaporated to dryness giving 1.37 g. of yellow solid. Gas chromatographic analysis shows the solid to be 15% 2-cyano-1-methyl-5-nitroimidazole and 77% 1,2-dimethyl-5-nitroimidazole.

By the above procedure 2-cyano-1-methyl-5-nitroimidazole is prepared by replacing the dinitrogen tetroxide with an equivalent amount of nitrogen pentoxide.

Example 7.—2-cyano-1-methyl-5-nitroimidazole

Liquid dinitrogen tetroxide (3.9 ml.) is added to a mixture of 1.41 g. of 1,2-dimethyl-5-nitroimidazole and 4.92 g. of sodium acetate in 50 ml. of dry nitromethane. The pressure vessel is closed and heated in an oil bath at 78–82° for 4 hours. The vessel is cooled to room temperature in a water bath and the pressure is released. The excess dinitrogen tetroxide is evaporated and the solid is filtered. The filtrate is evaporated to dryness and the residue is slurried with 50 ml. of benzene. The supernatant is decanted and evaporated to dryness to give 0.053 g. of yellow oil. Gas chromatographic analysis of this oil shows it to be mainly 2-cyano-1-methyl-5-nitroimidazole along with 1,2-dimethyl-5-nitroimidazole. The benzene insoluble oil from above is treated with aqueous sodium bicarbonate solution and extracted with chloroform. The extracts are washed, dried and evaporated to dryness leaving 1.075 g. of residue. The residue is shown to be a mixture of mainly 1,2-dimethyl-5-nitroimidazole along with some 2-cyano-1-methyl-5-nitroimidazole by gas chromatographic comparison to authentic material. The analysis shows a yield of 21% 2-cyano-1-methyl-5-nitroimidazole and 53% 1,2-dimethyl-5-nitroimidazole.

In a similar manner 2-cyano-1-methyl-5-nitroimidazole is obtained when the sodium acetate is replaced by sodium formate, sodium propionate, sodium benzoate, potassium acetate, sodium carbonate, potassium carbonate or disodium phosphate.

Example 8.—2-cyano-1-methyl-5-nitroimidazole

A mixture of 4.92 g. of sodium acetate and 3.9 ml. of dinitrogen tetroxide in 50 ml. of dry nitromethane is stirred at room temperature for 6 hours. To this slurry is added 1.41 g. of 1,2-dimethyl-5-nitroimidazole and the mixture is stirred for 17 hours at room temperature in a closed vessel. The solid is filtered and washed with nitromethane and the filtrate is evaporated to dryness. The residue is made alkaline with aqueous sodium bicarbonate solution and extracted with chloroform. Evaporation of the chloroform solution affords 1.23 g. of yellow solid, which is shown by gas chromatographic analysis to be 1,2-dimethyl-5-nitroimidazole along with a trace of 2-cyano-1-methyl-5-nitroimidazole.

Example 9.—2-cyano-1-methyl-5-nitroimidazole

A solution of 1.41 g. of 1,2-dimethyl-5-nitroimidazole in 50 ml. of nitromethane is cooled in Dry Ice-acetone and 3.9 ml. of liquid nitrogen trioxide is added. The pressure vessel is closed and heated in an oil bath at 67–78° for 4 hours. The vessel is cooled in a water bath and opened. The solution is evaporated to dryness and the residue is slurried with two 25 ml. portions of benzene. The supernatant is decanted and evaporated to dryness leaving 0.110 g. of pale yellow oil, which solidifies on standing. The solid is shown to be 2-cyano-1-methyl-5-nitro-imidazole by gas chromatographic comparison to authentic material. The benzene insoluble oil affords 1.15 g. of 1,2-dimethyl-5-nitroimidazole upon treatment with aqueous sodium bicarbonate.

In a similar manner, using 1.6 ml. of nitrogen trioxide affords 0.118 g. of material which is mainly 2-cyano-1-methyl-5-nitroimidazole.

Example 10.—2-cyano-1-methyl-5-nitroimidazole

Following the procedure in Example 9 and heating at 95–111° for 4 hours gives 0.198 g. of 2-cyano-1-methyl-5-nitroimidazole and 1.10 g. of 1,2-dimethyl-5-nitroimidazole.

Example 11.—2-cyano-1-methyl-5-nitroimidazole

The procedure in Example 9 is followed and the reaction mixture is heated at 100–106° for 24 hours. The reaction mixture is evaporated to dryness and the residue is slurried with 100 ml. of benzene. The supernatant is decanted and evaporated to give 0.45 g. of 2-cyano-1-methyl-5-nitroimidazole.

Example 12.—2-cyano-1-methyl-5-nitroimidazole

To a mixture of 1.41 g. of 1,2-dimethyl-5-nitroimidazole and 4.92 g. of sodium acetate in 50 ml. of nitromethane is added 3.9 ml. of nitrogen trioxide. The pressure vessel is closed and heated in an oil bath at 75–81° for 3½ hours. The reaction mixture is cooled and the solid is filtered. The filtrate is evaporated to dryness and the residue is washed with 100 ml. of benzene. The washings are evaporated to dryness and the residue is treated with aqueous sodium bicarbonate and extracted with chloroform. Evaporation of the organic layer gives 1.15 g. of yellow solid. Gas chromatography shows it to be a mixture of 2-cyano-1-methyl-5-nitroimidazole and 1,2-dimethyl-5-nitroimidazole.

Example 13.—2-cyano-1-methyl-5-nitroimidazole

Liquid dinitrogen tetroxide (2.0 ml.) is added to a cold solution of 1.41 g. of 1,2-dimethyl-5-nitroimidazole in 50 ml. of nitromethane in a 3-necked flask, fitted with thermometer and reflux condenser with drying tube. The solution is stirred and heated at 57–80° for 4¼ hours. The reaction mixture is evaporated to dryness and the residue is slurried with benzene. The supernatant is decanted and evaporated to dryness giving 0.11 g. of yellow oil which is shown to be 2-cyano-1-methyl-5-nitroimidazole. The benzene insoluble oil affords 1.13 g. of 1,2-dimethyl-5-nitroimidazole following aqueous sodium bicarbonate workup.

Example 14.—Picolinonitrile

To a cold solution of 1.86 g. of 2-picoline in 50 ml. of nitromethane in a 200 ml. pressure bottle is added 3.8 ml. of liquid dinitrogen tetroxide. The bottle is closed and heated in an oil bath at 84–97° for 3½ hours. The pressure is released and the reaction mixture is evaporated to dryness. The residue is slurried with water and made alkaline with 10% sodium bicarbonate solution. The resulting solution is extracted with dichloromethane and the organic layer evaporated to dryness to yield 1.28 g. of brown oil. The oil is shown to be a mixture of starting 2-picoline and picolinonitrile by gas chromatographic comparison to authentic material.

Picolinonitrile is prepared, according to the above procedure, by substituting an equivalent amount of nitrogen trioxide or nitrogen pentoxide for dinitrogen tetroxide.

Example 15.—Picolinonitrile

To a cold mixture of 1.86 g. of 2-picoline and 4.92 g. of sodium acetate in 50 ml. of nitromethane is added 3.8 ml. of liquid dinitrogen tetroxide. The vessel is closed and heated at 77–79° for 4 hours. The pressure is released and the solid is filtered and washed with nitromethane. The filtrate is evaporated to dryness and the residue is treated with aqueous sodium bicarbonate. The resulting solution is extracted with dichloromethane and the organic layer is evaporated to dryness affords 0.70 g. of a brown liquid, which is shown to be a mixture of 2-picoline and picolinonitrile.

In a similar manner pyrazinonitrile, 4-pyridazinecarbonitrile, 2-pyrimidinecarbonitrile and 1,2,4-thiadiazole-3-carbonitrile are prepared from methylpyrazine, 4-methylpyridazine, 2-methylpyrimidine and 3-methyl-1,2,4-thiadiazole, respectively.

Example 16.—Isonicotinonitrile

Liquid dinitrogen tetroxide (3.9 ml.) is added to a cold mixture of 1.86 g. of 4-picoline and 4.92 g. of sodium acetate in 50 ml. of nitromethane. The pressure vessel is closed and the reaction mixture is heated at 73–84° for 4¼ hours. The pressure is released and the solid is filtered and washed with nitromethane. The filtrate is kept overnight at room temperature and the solid is filtered affording 0.34 g. of isonicotinic acid. The filtrate is evaporated to dryness and the residue is made alkaline with aqueous sodium bicarbonate. The solution is extracted with dichloromethane and the organic layer is evaporated leaving 0.526 g. of brown liquid. The liquid is shown to be a mixture of 4-picoline and isonicotinonitrile by gas chromatographic comparison to authentic material.

Example 17.—4-cyanothiazole

To a solution of 2.0 g. of 4-methylthiazole in 50 ml. of dry nitromethane in a 200 ml. pressure bottle is added 3.8 ml. of liquid dinitrogen tetroxide. The bottle is closed and heated at 60–70° for 4½ hours. The reaction mixture is cooled to room temperature, the pressure is released and the solution is evaporated to dryness. The residue is slurried with aqueous sodium bicarbonate and extracted with dichloromethane. The organic layer is carefully evaporated to dryness leaving 0.93 g. of 4-cyanothiazole having a nitrile band in the infrared spectrum at 2250 cm.$^{-1}$.

Example 18

The herbicidal activity of pyrazinonitrile is demonstrated in the following test wherein seeds of wheat, corn, radish and cucumber are placed on water agar (1.5%) containing 500 p.p.m. of said compound. Two ml. of water is added to each bottle and covered for 48 hours with a glass plate, then with kraft paper to facilitate germination. The seeds and plants are observed periodically following treatment and water is added as required.

Three weeks after treatment all seeds are examined and evaluated as to seed germination, root growth and shoot growth. Untreated agar with seeds of the same plant species are used as controls. In these tests pyrazinonitrile produced complete kill of all seeds excepting corn which showed the effects of severe herbitoxicity.

Example 19

Nematocidal activity with picolinonitrile was observed in the following tests wherein 100 p.p.m. of said compound dispersed in an aqueous medium was placed in one dram "opticlear vials" with vinegar eelworms, *Turbatrix aceti* added. The vials were placed on a tumbling drum and the drum rotated for 24 hours to assure contact of the eelworms with the test compound. After 24 hours the vials were examined to determine percent mortality. Untreated solutions with vinegar eelworm added were used as controls. In these tests picolinonitrile at 100 p.p.m. gave complete kill.

We claim:

1. A method for the preparation of compounds having a formula selected from the group consisting of:

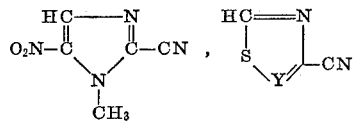

wherein Y represents a member selected from the group consisting of N and CH; and

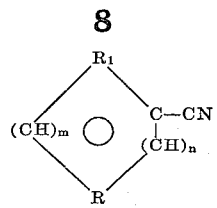

where R and $R_1$ each represent a member selected from the group consisting of N, N=N and CH, $m$ and $n$ each represent an integer selected from the group consisting of 0, 1 and 2 and provided that at least one of R and $R_1$ represents a member other than CH and that the resulting compounds are limited to 6-membered rings; comprising, reacting a compound having a formula selected from the group consisting of:

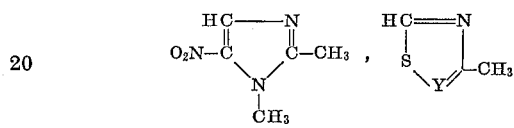

and

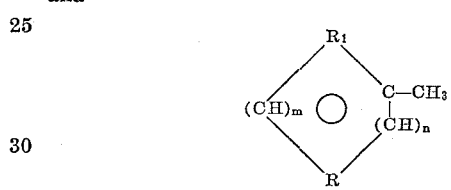

with a nitrogen- and oxygen-containing compound selected from the group consisting of nitrogen tetroxide, nitrogen trioxide, nitrogen pentoxide and nitrosyl chloride, in the presence of an inert organic solvent, at a temperature between about 25° and 150° C., at a pressure between about 1 and 10 atmospheres and in the presence of a base.

2. A method according to claim 1 wherein the compound prepared is a 5-membered heteroaromatic nitrile selected from the group consisting of

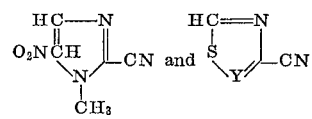

wherein Y is as described above and is formed by reacting a compound selected from the group consisting of:

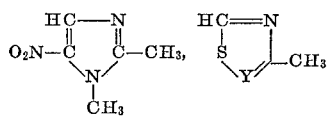

with a nitrogen- and oxygen-containing compound selected from the group consisting of nitrogen tetroxide, nitrogen trioxide, nitrogen pentoxide and nitrosyl chloride in the presence of a solvent selected from the group consisting of benzene, nitrobenzene, carbon tetrachloride, nitromethane and acetonitrile, at a temperature between 50° C. and 120° C. and at a pressure between 1 and 10 atmospheres.

3. A method according to claim 2 wherein said reaction is carried out in the presence of a base selected from the group consisting of alkali metal salts of organic and inorganic acids.

4. A method according to claim 3 wherein the salt is selected from the group consisting of the acetates, formates, propionates, benzoates, carbonates and phosphates of potassium and sodium.

5. A method according to claim 1 wherein the compound prepared has the formula:

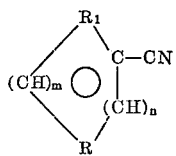

wherein R, $R_1$, $m$ and $n$ are as described above and said compounds are prepared by reacting a compound of the formula:

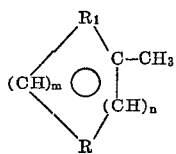

where R, $R_1$, $m$ and $n$ are as described above, with a nitrogen oxygen-containing compound selected from the group consisting of nitrogen tetroxide, nitrogen trioxide, nitrogen pentoxide and nitrosyl chloride in the presence of a solvent selected from the group consisting of benzene, nitrobenzene, carbon tetrachloride, nitromethane and acetonitrile, at a temperature between 50° C. and 120° C. and at a pressure of from 1 to 10 atmospheres.

6. A method according to claim 5 wherein the reaction is carried out in the presence of an alkali metal salt of an organic or inorganic acid.

7. A method according to claim 6 wherein the salt is selected from the group consisting of the acetates, formates, propionates, benzoates, carbonates and phosphates of potassium and sodium.

References Cited

UNITED STATES PATENTS 3,441,591  4/1969  Hüter _____ 260—464

OTHER REFERENCES

Fischer: Chem. Ing. Tech. 38 (1), 35–7 (1966).

HENRY R. JILES, Primary Examiner

G. T. TODD, Assistant Examiner

U.S. Cl. X.R.

71—90, 92, 93, 94; 260—248 AS, 250 A, 251 R, 294.9, 302 R, 302 D, 309; 424—249, 250, 251, 263, 270, 273